(12) United States Patent
Bopp

(10) Patent No.: US 7,445,837 B2
(45) Date of Patent: Nov. 4, 2008

(54) METHOD FOR PRODUCING COMPOSITE ELEMENTS AND COMPOSITE ELEMENT

(76) Inventor: Michael Bopp, Auf den Stuecken 2a, 58455 Witten (DE)

( * ) Notice: Subject to any disclaimer, the term of this patent is extended or adjusted under 35 U.S.C. 154(b) by 470 days.

(21) Appl. No.: 10/311,550

(22) PCT Filed: Jun. 29, 2001

(86) PCT No.: PCT/EP01/07489

§ 371 (c)(1), (2), (4) Date: Apr. 3, 2003

(87) PCT Pub. No.: WO02/02325

PCT Pub. Date: Jan. 10, 2002

(65) Prior Publication Data

US 2004/0091615 A1 May 13, 2004

(30) Foreign Application Priority Data

Jul. 3, 2000 (DE) ................................ 100 33 322

(51) Int. Cl.
*B32B 3/26* (2006.01)
*B32B 3/06* (2006.01)
*B32B 5/14* (2006.01)
*B32B 7/12* (2006.01)

(52) U.S. Cl. .............. 428/304.4; 428/306.6; 428/309.9; 428/317.1; 428/317.7

(58) Field of Classification Search .............. 428/304.4, 428/306.6, 311.11, 309.9, 317.1, 317.7
See application file for complete search history.

(56) References Cited

U.S. PATENT DOCUMENTS

| 3,519,618 | A | * | 7/1970 | Parmerter ................. 536/104 |
|---|---|---|---|---|
| 4,111,081 | A | | 9/1978 | Hilliard et al. |
| 4,386,676 | A | | 6/1983 | Gadde et al. |
| 5,134,014 | A | * | 7/1992 | Zaima et al. ................. 428/186 |
| 5,493,081 | A | | 2/1996 | Manigold |
| 5,914,184 | A | | 6/1999 | Morman |
| 5,972,810 | A | | 10/1999 | Gabrish et al. |
| 5,993,589 | A | | 11/1999 | Morman |
| 6,133,172 | A | | 10/2000 | Sevenish et al. |
| 6,180,280 | B1 | | 1/2001 | Spotnitz |

FOREIGN PATENT DOCUMENTS

DE 3042023 A1 5/1981

(Continued)

OTHER PUBLICATIONS

English translation of EP 0 922 563 (see IDS filed Feb. 9, 2004 for author, title and date).*

(Continued)

*Primary Examiner*—Victor S Chang
(74) *Attorney, Agent, or Firm*—Marshall & Melhorn, LLC

(57) ABSTRACT

A method is proposed for producing composite elements which have at least one core and cover layers containing two fibres, with the following steps:
  coating of open-pored, semi-finished products comprising fibre materials with fine-grained, pulverulent, cross-linking resin, in such a manner that the open porosity remains,
  forming of an arrangement of at least one open-pored core and two coated semi-finished products in a forming tool which is heated to the cross-linking temperature of the pulverulent resin.

8 Claims, 1 Drawing Sheet

FOREIGN PATENT DOCUMENTS

| | | |
|---|---|---|
| DE | 4131394 A1 | 4/1993 |
| DE | 19612211 A1 | 10/1997 |
| DE | 19722997 A | 12/1998 |
| EP | 0 922 563 A | 6/1999 |
| EP | 0 922 563 A1 | 6/1999 |
| EP | 0 942 480 A1 | 9/1999 |
| EP | 1 128 988 B1 | 10/2002 |
| WO | WO 98/30375 A1 | 7/1998 |
| WO | WO 00/27671 A1 | 3/2000 |

OTHER PUBLICATIONS

Bernd, et al., Die Angewandte Makromolekulare Chemie 272, pp. 5-10.*

* cited by examiner

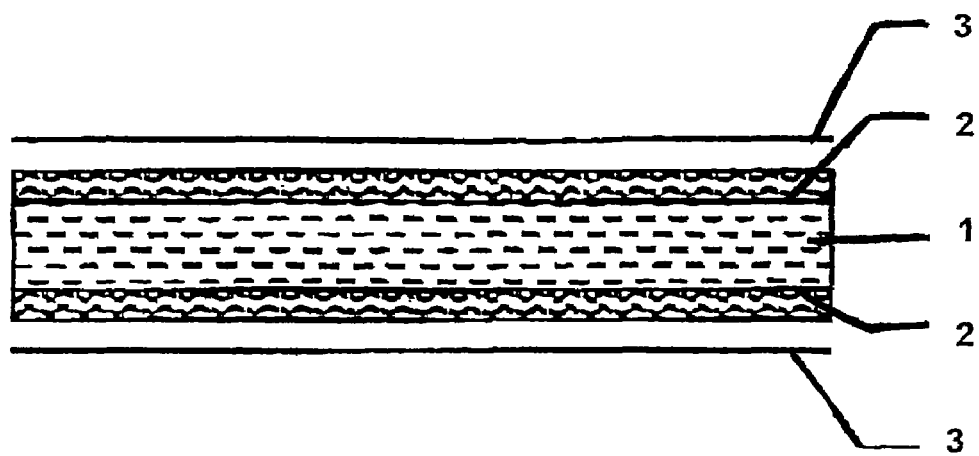
Figure

METHOD FOR PRODUCING COMPOSITE ELEMENTS AND COMPOSITE ELEMENT

BACKGROUND OF THE INVENTION

The invention relates to a method for producing composite elements according to the preamble of the main claim and a composite element corresponding to the preamble of the independent claim.

Composite elements in a sandwich arrangement with at least one core and cover layers are known. The core material is thereby built up based on rigid foam, semi-rigid foam or flexible foam polyurethane and/or polypropylene and/or expandable polystyrene (EPS) and/or styrene derivatives (maleic acid-anhydride-styrene-acrylic). In the case of thermoplastic structures, cover layers made of compact films are bonded by the foamed core to form the sandwich element and, after heating the composite, are formed in forming tools so as to form three-dimensional bodies, such as for example ready-made inside roof linings in automobile construction. The sandwich arrangement comprising core layers and cover layers is produced either by multilayer extrusion or by lamination. The decorative cover layers are generally not fibre-reinforced but can also be produced by applying fibres of different types (natural fibres, glass fibres) in the presence of thermoplastic binders, generally in the form of powders by means of sintering.

When producing polyurethane sandwich structures by cold-forming, a foamed core made of rigid or semi-rigid foam polyurethane, which is thermally formable still to a certain degree, is provided on both sides with cover layers made of glass fibre/thermoplastic. The cover layers are thereby applied almost exclusively today in the on-line method by sprinkling thermoplastic powders with simultaneous addition of cut glass fibres from a roving by means of a cutting tool onto a conveyor belt for the lower cover layer and likewise onto the foamed core plate for the upper cover layer. This composite is subsequently sintered in a continuous heating device, for example in a double belt heating press, bonded and subsequently formed directly in a forming tool, into which simultaneously a textile is also introduced as surface decoration, so as to form three-dimensional bodies, for example moulded inside roof linings for automobiles. Subsequently, trimming takes place by means of punching, water jet cutting or methods of this type and the finished product is obtained, which is suitable for sheeting. This product is suitable for normal temperature usage up to approximately 105° C.

In another embodiment of the polyurethane application, the high adhesive force of polyurethane mixtures is used for bonding with the cover layers. A mixture of polyurethane polyol components with activators and MDI (44' methylene di(phenylisocyanate) is thereby sprayed on a carrier material, for example polyethylene film, paper with polyethylene and/or polyurethane film covering, and glass fibre pieces are applied to the lower and upper cover layers. The decorative covering is undertaken generally by a textile with a sealing film and the prepared composite is immediately formed in a forming tool preheated to approximately 50-80° C. and cured. The products obtained after trimming are also usable at increased temperatures up to approximately 125° C.

The disadvantage of all these known composites is the inadequate acoustic effect since either only closed-pore core materials are used or the cover layers are no longer permeable due to sealing measures as in the just described embodiments. As a result, the absorbent effect desired in the interior of for example automobiles for reducing airborne noise is no longer offered.

For acoustic insulation parts in the engine compartment, such as for example bonnets, there are used nowadays so-called light foams, polyurethane semi-rigid foams with low relative density of 6-20 $kg/m^3$ and surface mats based on polyethylene terephthalate (PET)/cellulose/polyacrylic (PA)/C-polyacrylonitrile (C-PAN) and mixtures of these. The surface mats are provided with adhesive coatings based on polyethylene (PE) (CoPES/MF (chemical fibres made of polyester-copolymers/melamine formaldehyde) and are processed in hot tools at 140-200° C. to form formed parts. To date more rigid products have been produced for use mainly by choice of surface mats. The disadvantage is an expensive cover mat with reduced acoustic behaviour. If surface mats with inserts made of glass fibres, which were produced by extrusion coating with polypropylene, are used the acoustic properties are reduced likewise. In addition structures of this type are not stable enough at high temperatures greater than 100° C.

SUMMARY OF THE INVENTION

The object therefore underlying the invention is to produce a method for producing rigid, light sandwich composite elements with supporting cover layers and the composite elements themselves, which also remain dimensionally stable even at fairly high temperatures up to 150° C. and which are damping with respect to acoustics.

This object is achieved according to the invention by the method according to the main claim and the composite element of the independent claim.

As a result of the fact that an open-pored, semi-finished product comprising fibre materials is coated with fine-grained, pulverulent, cross-linking resin in such a way that the open porosity remains and a sandwich arrangement, comprising at least one open-pored core and two coated semi-finished products forming the cover layers, is formed, which is formed in a forming tool heated to the cross-linking temperature of the pulverulent resin so as to form the composite element, this composite has a high acoustic and thermal insulating effect, with a simultaneous temperature-stable, rigid and light design and makes possible the use both in the interior of a vehicle and also for structures in the engine compartment, such as end walls, bonnet absorbers, transmission tunnels and the like.

The "open porosity" is ensured by two measures or properties of the used materials.
1. The used powder materials are very fine-grained and are not film-forming or only slightly.
2. The used fibre mats are fine-fibred and have a high specific surface.

Due to this combination, a coating of up to 200% of the used fibre mat can be achieved without a closed or predominantly closed layer being produced. Coating of the fibres and bonding of the fibres takes place predominantly at the intersection points. Consequently, the strength of the fibre mats is achieved and in particular the shearing strength (folding) is significantly improved.

Even during the production process of the composite elements, it remains in the previously described state since melting and cross-linking of the pulverulent resins only takes place at the place of the attachment to the fibre mat.

Due to the measures indicated in the sub-claims, advantageous developments and improvements are possible.

Preferably, the cover layer is produced as coated semi-finished products separately from the actual core. For the semi-finished products, corresponding to the subsequent purpose of the composite element, different materials from the following group are selected alone or in combination with each other: glass fibre mats, glass fibre layering, continuous or staple fibre glass fibre mats, synthetic fibre mats made of for example polyethylene, polyamide or others, as long as their melting point is higher than 160° C., natural fibre mats made of jute, hemp, sisal, flax, kenaf, cotton and/or metal fibres or metal fibre knitted materials or mixtures.

The fibre materials formed as semi-finished products are provided by methods, which are basically known in the state of the art, with a powder matrix made of fine-grained, cross-linking, i.e. reactive resin, the reactive resin being bonded to the fibres by preheating at a temperature lying below the cross-linking temperature.

As reactive resin there can be used the most varied of materials, for example ethylene-propylene-copolymers, unsaturated polyesters, polyurethanes and combinations thereof, leftover materials from the powder coating industry based on polyester, polyamides, polyacrylates, powder products based on phenol resin and combinations of the previously mentioned materials. These resins can be used as powder mixture with a heterogeneous composition or they are adjusted by addition of modifiers and accelerators, such as imidazole compounds, to the specific application case.

As already explained above, various methods for coating the fibre materials with the powder matrix can be provided. In an advantageous manner, the coating takes places according to the method of bonding and attaching by means of a film-forming medium. The pulverulent reactive resin is thereby converted with a thickening agent into an aqueous dispersion. As thickening agent for producing an aqueous dispersion there can be used for example cetylmethylcellulose, vinyl acetate dispersions, polyvinyl alcohol (PVA) solutions, starch, polysaccharides and the like. After coating with the dispersion, the semi-finished products are dried and in fact at temperatures at which the reactive powder resins are not yet activated and a premature cross-linking is prevented. The coated semi-finished products are then available for further processing.

In the case of another coating method, the reactive powder resins are sprinkled on the semi-finished product and melted-on at corresponding temperatures so that the resin combines with the fibres. For respective coating methods, a foaming agent can also be added. There can be applied as coating methods, the methods known per se, such as painting, spreading, spraying, transferring, splashing, immersing, padding etc.

The coating quantity is based on the subsequent use and is normally 20-200% of the surface weight in g/m$^2$ of the respective semi-finished product made of fibre material.

A lower coating quantity produces a high air permeability and low rigidity, whilst a high coating quantity produces a lower air permeability and high rigidity.

Due to the type of fibres or fibre fleeces or mats which are used and the choice of the reactive powder resin, a network is produced which has a high proportion of open structures. The choice is thereby based on the subsequent use, temperature stressing, flame resistance etc. Hence, the air permeability is ensured which is required for an effective sound absorption. According to the fibre type, powder resin type and coating quantity, the air permeability can be controlled such that a flow resistance, which is established for subsequent use and noise reduction, can be set. In a preferred manner, various flow resistances can be assigned hence to the cover layers of a composite element if it serves the purpose of use.

As a material for the open-pored core there can be used for example a foam or fibre material which cannot melt at a temperature up to 200° C. and is adjustable in its compressive strength or resistance to pressure. The semi-rigid, thermally deformable polyurethane foams have proved thereby to be particularly suitable. There can be also used as core material however, a honeycomb structure produced from saturated or unsaturated paper and/or from perforated aluminium. There can be used as further core material also knitted fabrics produced by textile techniques which are known under the term spaced weaves. Other materials are also conceivable which, like the above-described materials, have no closed pores and which are therefore suitable for sound absorption.

In an advantageous manner, the structure of the core material can be modified for thermal insulation by insertion of high temperature-resistant materials, such as mineral fibre mats, MF foams, silicate fibre papers or mats.

In order to produce the composite elements, the coated semi-finished products as cover layers and the open-pored cores are placed in a sandwich arrangement. The coated semi-finished products can be stored in the form of rolls or blanks. During their processing into composite elements, these coated semi-finished products are supplied to a processing plant for layer-wise construction. In this plant, the respective semi-finished product is sprayed with a predetermined quantity of water by pure atomisation. The quantity is based upon the type and deformation degree of the formed part and is produced via the quantity regulation known in the state of the art. Consequently, the previously fairly inflexible mat becomes wet through and flexible and can be formed extensively in a form-shaping manner. In addition, the bonding of the powder particles produced by binders or thickening agents is reduced and hence better wetting of the different layers of the construction is achieved.

For the forming and curing, the sandwich arrangement comprising core layer and upper and lower cover layer is transported into a forming tool heated to cross-linking temperature of the respective resin. The forming tool must be provided with vents corresponding to the mould, conveniently on both mould halves in order that the residual moisture still present during curing can escape from the forming tool without a fairly large pressure build-up. For rapid heating of the composite, regulation of the pressure build-up and pressure reduction can be implemented also and hence a shorter mould dwell time is achieved. In order to avoid damage to the composite and/or to the plant component, the pressure reduction must be effected before opening the forming tool such that in a predetermined time interval, the pressure is reduced to atmospheric pressure.

In a further forming method, the composite elements can also be processed without pre-moistening of the coated semi-finished products. For this purpose, the sandwich arrangement or the composite is heated firstly to a temperature which is above the melting temperature of the respectively used reactive resin and the composites heated in this manner are transported directly and rapidly into the forming tool heated to cross-linking temperature of the respective resin. In the case of this method also, vents should be provided in the forming tools.

The formed parts or composite elements removed from the forming tools can then be supplied to their purpose of use or be provided in a second operating step with decorative surface layers. The composite elements can be used as covering parts in the interior of vehicles, such as for example ready-made inner roof linings, said parts having excellent heat resistance and acoustic properties. For acoustically effective parts in the engine compartment, the composite elements can be used as deflection-resistant, very light parts which are provided with few attachment points because of their high intrinsic rigidity. Furthermore, the composite elements are provided as bonnets, motor-side end walls, tunnel insulations, engine compartment bulkheads, spare wheel cavities or insulations and tank insulations, both noise reduction and also thermal protection being offered. For inflammable surroundings, the cover layers can also be provided with flame protection in the form of solid materials, such as aluminium hydroxide, melamine resin powder, so that their inflammability is low.

Of course, a plurality of layers can also be provided in a corresponding manner in various sequences for the composite elements, it is essential however that the open-pored character of the entire arrangement remains even after forming and after the effect of temperatures between 120-200° C.

BRIEF DESCRIPTION OF THE DRAWINGS

An example of a composite element is shown in the accompanying drawing, which is represented in one FIGURE.

DESCRIPTION OF THE PREFERRED EMBODIMENTS

An example of a composite element is specified in the following corresponding to the single FIGURE. The sandwich construction for the composite element comprises thereby a core 1 in polyurethane light foam with 12-15 kg/m$^3$, two semi-finished products or cover layers 2 which are coated and disposed on respectively one side of the core and cover mats 3 applied thereon. This arrangement serves for producing strong and deflection-resistant insulation parts. The cover layers comprise coated glass mat, for example Microlit SAC 50/2 and the cover mat is formed on the basis of viscose/PET with 45 g/m$^2$. The glass mat which is used in the cover layer 2 is coated on a flat underlayer with a coating mass by means of rolling-on. The coating quantity is chosen such that at most 220 g/m$^2$ of the coating is applied wet and distributed uniformly. The coated glass mat is subsequently dried in a drying device until the moisture falls below 6% by weight. Subsequently, the dried glass mats can be stored. In the normal conditions of 20-25° C./50-55% relative moisture, the glass mats, packed in films, can be stored for several weeks.

Should an injection-moulding method be chosen for the coating, application on both sides with respectively 110-120 g/m$^2$ is required because of the solid material content since the glass mat acts as a "filter". During the injection-moulding method, care must be taken to provide a uniform distribution and a wet-in-wet application. The drying is implemented in the previously described manner.

In order to produce the composite according to the FIGURE, first of all a layer of cover mat with a surface weight of 30-50 g/m$^2$ and a PE sintering is placed with the sintered side upwards on a depositing table. A layer of the coated glass mat is applied hereon. The glass mat is moistened slightly by spraying with fine nozzles in the dried state. Only a light but uniform moistening should be effected hereby, generally 50-80 g/m$^2$ water being sufficient. The polyurethane light foam core material is placed on the moistened glass mat. This is thereafter covered with a layer of coated glass mat which is moistened in a similar manner, the upper cover mat being placed with the PE side towards the glass mat. The thus prepared sandwich packet is introduced into a forming press.

The forming press is closed at a temperature of 170° C.±10° C. until a light contact with the packet is achieved. The packet is preheated for 20 seconds and then the press is closed and pressed initially for 40 seconds. Thereafter the press is opened and possibly any required cover mat is placed therein according to choice. The press is closed once again for 20 seconds. After a total pressing time of 80 seconds, the formed part is placed on a form-fitting place of deposit in order to cool.

The relative airflow resistance of the composite elements according to the invention is between 150 and 450 kNs/m$^4$.

The invention claimed is:

1. A composite element having at least one core and cover layers containing two fibers in a sandwich layer, wherein the core comprises an open-pored material and the cover layers comprise fiber materials provided with a coating and present in the form of semi-finished products, the coating having reactive resin, which is a powder matrix of cross-linking ethylene-propylene copolymers, unsaturated polyesters and/or polyurethanes and cetyl-methylcellulose, vinylacetate dispersions, PVA solutions, starch or polysaccharides as a thickening agent.

2. A composite element according to claim 1, wherein the semi-finished product is formed as one of: a glass fiber mat, glass fiber layering, continuous or staple fiber glass fiber mat, synthetic fiber mat made of PET, PA or the like with a melting point of higher than 160° C., as a natural fiber mat made of jute, hemp, sisal, flax, kenaf, cotton or as metal fiber knitted material or mat.

3. A composite element according to claim 1, wherein the core comprises an open-pored material which cannot melt at a temperature up to 200° C.

4. A composite element according to claim 3, wherein the core has embedded mineral fibers, MF foam and/or silicate fibers.

5. A composite element according to claim 1, wherein a plurality of open-pored cores is provided with different materials and properties with respective interposition of a coated semi-finished product.

6. A composite element according to claim 1, wherein it has a relative airflow resistance of 150-450 kNs/m$^4$.

7. A composite element according to claim 3, wherein the core comprises a foamed or fiber material, or honeycomb structure produced from beamed or unsaturated paper or perforated aluminum, or knitted materials produced by textile techniques.

8. A composite element according to claim 5, wherein the cover layers have different flow resistances.

* * * * *